United States Patent

Kaneko et al.

Patent Number: 5,591,502
Date of Patent: Jan. 7, 1997

[54] MAGNETIC RECORDING MEDIUM

[75] Inventors: Hideo Kaneko; Katsushi Tokunaga; Yoshio Tawara, all of Kanagawa-ken, Japan

[73] Assignee: Shin-Etsu Chemical Co., Ltd., Tokyo, Japan

[21] Appl. No.: 348,342

[22] Filed: Dec. 2, 1994

Related U.S. Application Data

[63] Continuation-in-part of Ser. No. 72,469, Jun. 4, 1993, abandoned.

[30] Foreign Application Priority Data

Jun. 16, 1992 [JP] Japan ..................... 4-181695

[51] Int. Cl.$^6$ ................ G11B 5/66; B32B 5/16; B32B 3/02
[52] U.S. Cl. .............. 428/65.3; 428/65.7; 428/336; 428/667; 428/694 T; 428/694 TS; 428/694 ST; 428/694 SG; 428/900; 204/192.2; 204/192.23
[58] Field of Search ................ 428/694 T, 694 TS, 428/900, 64, 694 ST, 694 SG, 336, 667; 204/192.2, 192.23

[56] References Cited

U.S. PATENT DOCUMENTS 4,689,260  8/1987  Briske ....................... 428/161

FOREIGN PATENT DOCUMENTS 3543254  6/1987  Germany.
850244562  of 1987  Japan.

*Primary Examiner*—Leszek Kiliman
*Attorney, Agent, or Firm*—McAulay Fisher Nissen Goldberg & Kiel, LLP

[57] ABSTRACT

Proposed is a magnetic recording medium consisting of a non-magnetic substrate and a magnetic recording layer formed thereon by the method of sputtering, in which the non-magnetic substrate is a disk of single crystal silicon having a surface of the crystallographic orientation of (100), the surface roughness Rp being 40 nm or smaller. By virtue of the use of the unique material for the substrate, the magnetic recording layer is outstandingly stable as compared with conventional aluminum or glass substrates and the magnetic layer formed thereon by sputtering has a greatly improved coercive force of 1300 oersted or higher.

8 Claims, No Drawings

MAGNETIC RECORDING MEDIUM

This is a continuation-in-part application from a U.S. patent application Ser. No. 08/072,469 filed Jun. 4, 1993, now abandoned.

BACKGROUND OF THE INVENTION

The present invention relates to a magnetic recording medium used in computers and other data-recording and data-processing instruments. More particularly, the invention relates to an improvement in a magnetic recording medium suitable for high-density information recording by virtue of the use of a single crystal wafer of semiconductor silicon as the non-magnetic substrate, on which the magnetic recording layer is formed by the dry-process film-forming method such as sputtering from a ferromagnetic material without using any binder materials and any particulate materials.

Along with the rapid progress in the electronics industry or information-predominating society utilizing computers and other electronic data processing machines, a recent trend in the computer technology is toward a larger and larger capacity of data-recording media. In particular, magnetic recording media or magnetic disks, which are still playing a leading role as an external memory device of computers, are required to have a capacity and a density of recording increasing year by year. This trend of requirements for a higher capacity and higher density of magnetic recording is further accelerated along with the prevalence of very compact personal computers such as so-called notebook-type and palm-top personal computers.

Magnetic recording media in general have a basic structure comprising a flat and smooth non-magnetic substrate plate usually in the form of a circular disk and a magnetic layer formed on at least one surface of the substrate plate. The substrate plate of a magnetic recording medium must satisfy various requirements in order that the recording medium can exhibit excellent performance. Several of such requirements for the substrate plates, which of course must be non-magnetic, include, for example, high mechanical strengths to ensure easy handling, smoothness of the surface to ensure a high recording density in the magnetic recording layer formed thereon with a small flying height of the magnetic head, good adhesion to the magnetic layer or undercoating layer thereof, stability of the configuration or form against warping or distortion, high abrasion resistance, light weight in order that the magnetic recording disk can be driven with a small power consumption and so on.

Typical materials conventionally used for substrate plates of magnetic recording media are aluminum or alloys thereof and glass. While glass-made substrate plates have a problem in the mechanical strengths, aluminum-made substrate plates have been used heretofore satisfactorily in respect of the above mentioned requirements. Along with the recent progress of the computer technology, however, the substrates of magnetic recording media are required to be further improved in respect of the smaller surface roughness, higher abrasion resistance and lower weight. Turning now to the material for the magnetic recording layer, it is traditional that the magnetic recording layer is formed by coating the surface of a substrate with a coating composition containing ferromagnetic fine particles and an organic resin as a binder of the magnetic particles. For example, U.S. Pat. No 4,689, 260 teaches to form elevations of an abrasion-resistant material anchored to the substrate surface on which a magnetic recording layer is formed by coating with a coating composition comprising a binder and magnetic particles To give a further explanation, while it is desirable that the magnetic recording layer formed on the substrate has a coercive force as high as possible, the magnetic layer of cobalt-based alloys conventionally used for the purpose is imparted with an increased coercive force when the film-forming sputtering process is performed at an increased temperature within a range up to a certain upper limit of the temperature so that the substrate is usually heated at an elevated temperature before formation of the magnetic layer. Since aluminum has a relatively low hardness, it is usual that the surface of an aluminum substrate is provided with an underlayer of nickel-phosphorus (NiP) having a higher hardness, such a NiP-plated aluminum substrate is subject to warping when the substrate is heated due to the great difference in the thermal expansion coefficient between aluminum and NiP and, in addition, NiP becomes magnetic when it is heated at 280° C. or higher. Glass substrates also have a problem of warping when they are heated at an elevated temperature and then cooled because it is usual that a glass substrate plate is used after a tempering treatment forming stressed surface layers.

In this regard, U.S. Pat. No. 4,675,240, which is equivalent to Japanese Patent Kokai 59-96539, proposes to use a silicon wafer as a substrate of a magnetic recording medium, on which an undercoating layer of chromium is first formed by sputtering and then a magnetic recording layer of an iron-cobalt-chromium alloy having a thickness of about 30 nm is formed thereon also by sputtering. Reportedly, the highest coercive force of the magnetic layer thus formed is 1000 oersted. A silicon wafer as a substrate is superior to aluminum substrates in several respects, for example, in the density of 2.3 $g/cm^3$, which is substantially smaller than that of an aluminum substrate, i.e. 2.7 $g/cm^3$, higher Vickers hardness than aluminum to ensure higher surface smoothness by polishing and to give a possibility of omitting a high-hardness underlayer of NiP and the much higher melting point of 1420° C. without transition points up to the melting point than 660° C. of aluminum so as to minimize distortion or warping of the substrate plate even when the substrate is heated up to 600° C. or higher in the course of the sputtering treatment for the formation of a magnetic layer thereon, for example, from a ferrite.

SUMMARY OF THE INVENTION

The present invention accordingly has an object to provide a novel magnetic recording medium of which the substrate is a wafer of semiconductor silicon capable of giving a magnetic recording layer formed thereon having a greatly increased coercive force and a possibility of greatly decreasing the flying height of a magnetic head not obtained in the silicon wafer-based magnetic recording medium disclosed in the above referenced United States patent.

Thus, the magnetic recording medium of the present invention is an integral body which comprises:

(a) a non-magnetic substrate which is a wafer of single crystal silicon grown by the Czochralski method, of which the surface is substantially in parallel with the crystallographic (100) plane of the single crystal; and (b) a continuous layer of a ferromagnetic material having a thickness not exceeding 100 nm formed by a dry-process method on at least one surface of the non-magnetic substrate either directly or with an intermediate layer intervening between the substrate surface and the magnetic recording layer, the surface of the non-magnetic substrate, on which the layer of the ferromagnetic material is formed, having a roughness Rp not exceeding 40 nm.

DETAILED DESCRIPTION OF THE PREFERRED EMBODIMENTS

As is understood from the above given summary of the invention, the most characteristic feature of the inventive magnetic recording medium consists in the use of a specific silicon single crystal disk as a substrate of a magnetic recording medium, by virtue of which a greatly increased coercive force can be obtained in the magnetic layer formed thereon and the flying height of a magnetic head can be greatly decreased. Although it is known in the prior art that a disk of a single crystal silicon as a substrate plate of a magnetic recording medium has several advantages in the above mentioned several respects as compared with aluminum- or glass-made substrates, it was a quite unexpected discovery that the advantages obtained by the use of a disk of single crystal silicon as the substrate plate are most remarkable when the substrate is a disk of a single crystal of silicon grown by the Czochralski method and sliced in a plane substantially in parallel with the crystallographic (100) plane and has a specified surface roughness. When such a specific silicon single crystal disk is used as a substrate on which a magnetic layer is formed by a dry-process method such as the sputtering method with an alloy of iron, cobalt and chromium, a high coercive force of 1300 oersted or even higher can be readily obtained without the troubles due to warping or distortion of the substrate which otherwise is unavoidable by heating before or in the course of the formation of the magnetic layer by sputtering.

As is well known, semiconductor silicon single crystals are industrially prepared either by the so-called Czochralski method, referred to as the CZ method hereinbelow, or by the so-called floating-zone melting method, referred to as the FZ method hereinbelow. Although any single crystal wafer of semiconductor silicon conventionally used in the manufacture of semiconductor-based electronic devices such as ICs and LSIs can be used as such as the substrate of a magnetic recording medium of the invention, disks of a silicon single crystal grown by the CZ method are preferred to those by the FZ method because single crystal silicon disks prepared by the CZ method have a significantly higher bending strength than the disks by the FZ method. As to the surface roughness of the silicon substrate used in the invention; commercially available semiconductor silicon wafers used as a base material of ICs and LSIs can be used as such since those commercially available silicon wafers have a very smooth mirror-polished surface after polishing. The diameter of the silicon substrate used in the invention is not particularly limitative depending on the particular requirement for the magnetic recording medium. Single crystal silicon wafers having a diameter of 6 inches or even larger are readily available as sold for the applications in the manufacture of ICs and LSIs. In view of the trend that the size of magnetic recording media is decreasing year by year, it is possible to obtain a plural number of substrate disks from a single silicon wafer of a large diameter. It is preferable that the strain in the surface layer of the substrate caused by the mechanical working is removed by a chemical etching treatment in respect of an increased mechanical strength. The thickness of the silicon single crystal substrate used in the invention is not particularly limitative provided that the silicon disk has a mechanical strength sufficient to withstand handling and operation in an ordinary way. The thickness is usually in the range from 0.2 mm to 1.3 mm but should preferably not exceed 0.7 min. For example, semiconductor silicon wafers having a thickness of 0.3 to 0.7 mm are commercially available as sold for ICs and LSIs and can be used satisfactorily.

The type of conductivity of the semiconductor silicon, i.e. p-type or n-type, and the value of the volume resistivity are not particularly limitative and any semiconductor silicon wafers available on the market can be used without particular problems. It is, however, preferable that the volume resistivity of the single crystal silicon disk is in the range from 0.1 to 100 ohm.cm. This requirement is made in consideration of the efficiency of the sputtering process for the formation of a magnetic recording layer thereon in which a bias voltage is sometimes applied to the substrate in order to improve the efficiency of sputtering. When the volume resistivity of the substrate is too low, a disadvantage is caused that the surface of the substrate is susceptible to the formation of an oxidized surface film which may eventually be detrimental on the performance of the magnetic recording layer or the intermediate underlayer formed thereon.

Needless to say, the silicon disk used as the substrate in the invention should preferably be a wafer of single crystal silicon because single crystal silicon disks have a significantly higher bending strength than polycrystalline silicon disks so that the thickness and hence weight of the substrate disk can be decreased so much assuming the same mechanical strength of the substrates.

It is preferable in the present invention that the silicon substrate has a surface which is substantially in parallel with the crystallographic plane of (100) because such a (100) wafer usually has a relatively high bending strength among the crystallographic planes of silicon single crystal having a relatively high symmetry including (100), (111) and (110) planes. The surface of silicon wafer as the non-magnetic substrate, on which the magnetic recording layer is formed either directly or with intervention of an underlayer, should have a roughness Rp not exceeding 40 nm in order to ensure a sufficiently small flying height of the magnetic head on the recording layer.

The type of the magnetic layer formed on at least one surface of the silicon wafer as the substrate is not particularly limitative and can be selected from those conventionally used in magnetic recording media with an aluminum or glass substrate although the magnetic layer should preferably be formed by the technique of sputtering with a magnetic alloy including those of iron, cobalt and chromium, cobalt, chromium and tantalum, nickel, platinum or boron and the like, of which cobalt-chromium-tantalum alloys are preferred. The magnetic layer should have a thickness, usually, in the range from 10 to 300 nm or, preferably, from 10 to 100 nm and is selected depending on the particular intended application of the magnetic recording medium. The advantages of the invention cannot be obtained when the magnetic recording layer is formed by coating the substrate surface with a coating composition containing a resinous binder and magnetic particles. The procedure for the sputtering deposition of the magnetic alloy on the substrate surface can be conventional without particular limitations. It is preferable that the sputtering deposition of the magnetic layer on the substrate surface is preceded by the formation of an intermediate underlayer made, for example, from chromium also by the sputtering method.

In the following, the magnetic recording medium of the invention is illustrated in more detail by way of examples.

EXAMPLE

A single crystal rod of semiconductor silicon having a diameter of about 6 inches grown by the CZ method in the crystallographic axial direction of <100> was sliced in a plane perpendicular to the growing axis of the single crystal rod into wafers, of which the surface was substantially in parallel with the crystallographic (100) plane and the volume resistivity was about 10 ohm-cm. After lapping of the surface of the wafers, a plural number of annular disks having an outer diameter of 48 mm and an inner diameter of 12 mm were taken from the wafers by cutting with a laser beam cutter. After chamfering and an etching treatment to remove the surface stress by using a conventional etching solution, the annular disks having a thickness of 0.38 mm were finished by polishing of the surface to have a surface roughness Rp of 7 nm followed by washing. The silicon disk was set in a sputtering apparatus and, after heating in a heating chamber at a temperature of 300° C. by using an infrared radiation heater, was subjected to successive sputtering deposition of, first, a chromium layer having a thickness of 100 nm, second, a magnetic layer of an alloy composition of $Co_{86}Cr_{12}Ta_2$ having a thickness of 60 nm by using a target of an alloy of the same composition and, finally, a surface protecting layer of carbon having a thickness of 30 nm in the respective sputtering chambers to complete a magnetic recording medium The thus prepared magnetic recording media were each subjected to the measurement of the coercive force by using a vibrating sample type magnetometer to find that the coercive force was a function of the heating temperature in the heating chamber of the sputtering apparatus and the value of the coercive force was 1300 oersted when the heating temperature was about 300° C. with a power consumption of 2.4 kilowatts in the infrared heater. The coercive force could be further increased by increasing the heating temperature above 300° C. The same heating temperature of the substrate and hence a coercive force of 1300 oersted of the magnetic layer could be obtained with a power consumption of 3.8 kilowatts in the infrared heater when the single crystal silicon disk as the substrate was replaced with a glass substrate having the same dimensions for comparative purpose. In addition, the value of the coercive force of the magnetic layer on the glass substrate levelled off even when the heating temperature was increased by further increasing the power consumption in the infrared heater. Further, the magnetic recording medium was mounted on a spin stand equipped with a magnetic head with an AE sensor, of which the relationship between revolution and flying height of the magnetic head was known by preliminary measurements, and the flying height of the magnetic head was determined from the revolution of the motor to find that the height was 0.04 µm or smaller.

What is claimed is:

1. A magnetic recording medium which comprises, as an integral body:

(a) a non-magnetic substrate which is a wafer of single crystal silicon grown by the Czochralski method, of which the surface is substantially in parallel with the crystallographic (100) plane of the single crystal; and (b) a continuous layer of a ferromagnetic material as a magnetic recording layer having a thickness not exceeding 100 nm formed by a dry-process method on at least one surface of the non-magnetic substrate either directly or with an intermediate layer intervening between the substrate surface and the magnetic recording layer, the surface of the non-magnetic substrate, on which the layer of the ferromagnetic material is formed, having a roughness Rp not exceeding 40 nm.

2. The magnetic recording medium according to claim 1 in which the surface of the single crystal silicon disk, on which the magnetic recording layer is formed, makes an angle not exceeding 20° with the crystallographic (100) plane of the single crystal silicon.

3. The magnetic recording medium according to claim 1 in which the single crystal silicon disk as the substrate plate is taken from a wafer of a single crystal silicon grown by the Czochralski method.

4. The magnetic recording medium according to claim 1 in which the single crystal silicon disk as the substrate plate has a volume resistivity not exceeding 100 ohm.cm.

5. The magnetic recording medium according to claim 1 in which the single crystal silicon disk as the substrate plate has a volume resistivity not lower than 0.1 ohm.cm.

6. The magnetic recording medium according to claim 1 in which the dry-process method is a sputtering method.

7. The magnetic recording medium according to claim 1 in which an intermediate layer intervenes between the magnetic recording layer and the substrate surface.

8. The magnetic recording medium according to claim 7 in which the intermediate layer is formed from an alloy of cobalt, chromium and tantalum.

* * * * *